J. H. McCLAREN.
BRAKE LEVER.
APPLICATION FILED MAY 27, 1910.
987,310.
Patented Mar. 21, 1911.
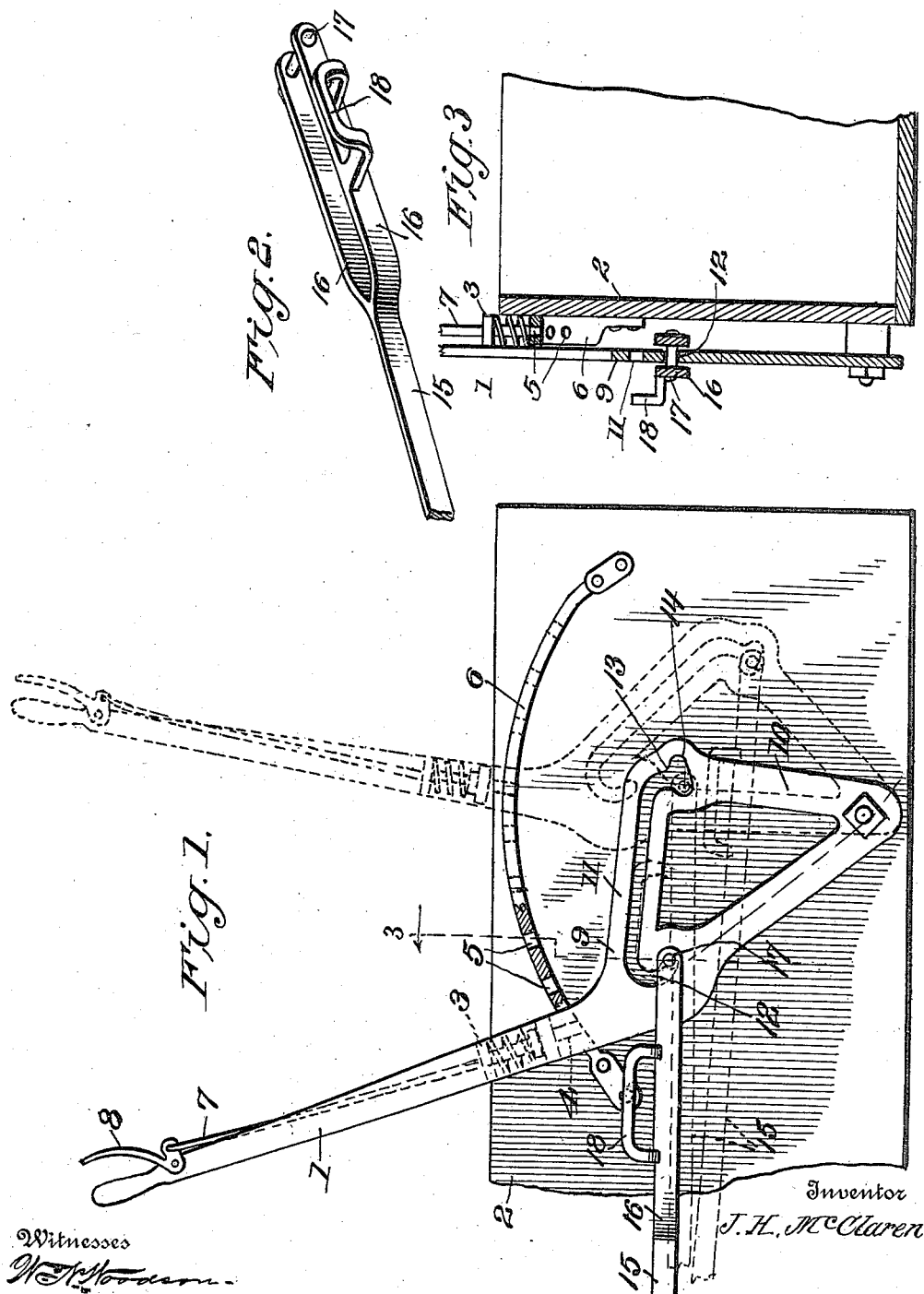
Inventor
J. H. McClaren

UNITED STATES PATENT OFFICE.

JOHN H. McCLAREN, OF WEST UNION, OHIO.

BRAKE-LEVER.

987,310.   Specification of Letters Patent.   Patented Mar. 21, 1911.

Application filed May 27, 1910. Serial No. 563,814.

*To all whom it may concern:*

Be it known that I, JOHN H. MCCLAREN, citizen of the United States, residing at West Union, in the county of Adams and State of Ohio, have invented certain new and useful Improvements in Brake-Levers, of which the following is a specification.

The present invention comprehends certain new and useful improvements in operating levers of that type adapted particularly for use in connection with the brake mechanism of a vehicle, the device being an improvement on the brake lever for which I received Letters Patent No. 912,595, dated February 16, 1909.

The object of the invention is a brake lever which has a slidable connection with the brake rod so as to permit the latter to be shifted manually relative thereto in order to effect the initial movement of the brake shoes toward the wheel, the brake lever being adapted to be turned about its fulcrum to effect the final movement of the brake shoes and apply the same to the wheels with considerable force.

A further object of the invention is a brake lever having an angularly disposed arm formed with a slot in which operates the bolt that connects the brake rod to the lever, the slot being formed at its ends with seating recesses adapted to receive the bolt, whereby to hold the brake rod against sliding movement relative to the lever.

A still further object of the invention is a device of this character which may be operated with facility, which is thoroughly practical and efficient in use, which possesses to a marked degree the characteristics of simplicity, durability and strength, and which is not likely to get out of order.

With these and other objects in view that will more fully appear as the description proceeds, the invention consists in certain constructions and arrangements of the parts that I shall hereinafter fully describe and then point out the novel features of in the appended claim.

For a full understanding of the invention and the merits thereof and also to acquire a knowledge of the details of construction, reference is to be had to the following description and accompanying drawing, in which:

Figure 1 is a side elevation illustrating the application of the invention, the different positions of the parts being indicated in dotted lines; Fig. 2 is a detail perspective view of one end of the brake rod; and, Fig. 3 is a section on the line 3—3 of Fig. 1.

Corresponding and like parts are referred to in the following description and indicated in all the views of the drawing by the same reference characters.

Referring to the drawing, the numeral 1 designates a hand lever which is fulcrumed at its lower end on a suitable support, such as the side of a wagon box 2. On its side adjacent to the wagon box the lever is provided intermediate of its ends with a bracket 3 in which is mounted a spring pressed latch 4, the latch being adapted to engage any selected one of a series of openings 5 formed in a segment 6 that is suitably secured to the said side of the wagon body. A connecting rod 7 is secured at one end to the latch and extends upwardly along the hand lever and is fastened at its upper end to one arm of an elbow lever 8 that is fulcrumed on and disposed at the upper end of the hand lever 1. By pressing the free arm of the elbow lever toward the main or hand lever, the latch is withdrawn from the segment to enable the hand lever to be swung forwardly or rearwardly about its fulcrum, according as desired. The hand lever is provided intermediate of its ends with an angularly disposed arm or extension 9 that projects obliquely forwardly and downwardly, as shown. An oblique brace 10 preferably connects the forward end of the extension with the lower end of the hand lever, whereby to increase the strength and rigidity of the parts. The extension and brace form together with the lower portion of the hand lever a substantially triangular structure. A substantially straight slot 11 extends throughout the length of the extension 9, the rear end of this slot being curved downwardly and forwardly to form a seating recess 12 for a purpose to be hereinafter disclosed. The forward end portion of this slot is turned angularly downwardly to constitute a seating recess 13 which is terminally enlarged, as indicated at 14, to provide opposed undercut front and rear walls.

The brake rod or connecting rod 15 extends rearwardly from the hand lever along the side of the wagon box, in the usual manner, and is operatively connected to the brake shoes (not shown). The forward end of the brake rod is bifurcated, for a suitable distance, as indicated at 16, so as to be adapted to embrace the hand lever and the extension, a bolt 17 being passed transversely between the bifurcations and through the slot for the purpose of slidably connecting the brake rod to the hand lever. The bolt 17 is shifted in the slot upon the sliding movement of the brake rod relative to the lever, such sliding movement being preferably effected manually, and one of the bifurcations being equipped with an outstanding hand hold or grip 18 to enable the operator to effect such movement with greater facility.

Before describing the practical use of the invention, it will be assumed that the parts are in the positions illustrated in full lines in Fig. 1, wherein the hand lever is latched to the rear portion of the segment, and the bolt 17 is received in the seating recess 12 so that the brake rod holds the brake shoes away from the wheels. To apply the brakes the operator grasps the hand hold 18 and lifts the bolt 17 out of the seating recess 12, the bolt being then adapted to slide longitudinally in the slot to permit the brake rod to be drawn forwardly relatively to the hand lever. Such movement of the brake rod causes the brake shoes to be swung toward and in close proximity to the wheels of the vehicle. The bolt 17 is permitted to drop into the seating recess 13 and is engaged by the undercut rear wall thereof so as to be positively held against accidental displacement. The application of the brakes is completed by merely disengaging the latch from the segment and throwing the hand lever forward, a comparatively slight movement of the lever being sufficient to hold the brake shoes against the wheels with considerable force. To release the brakes, the hand lever is swung rearwardly to effect the initial movement of the brake shoes away from the wheels, the bolt 17 being retained by the front undercut wall of the recess 13 during this movement of the lever, as is manifestly desirable in order to prevent the bolt from accidentally riding upwardly out of the seating recess. The operator then latches the lever to the rear portion of the segment and shifts the brake rod to withdraw the bolt from the seating recess 13 and to slide the same rearwardly therein and into the seating recess 12, the brake shoes are thereby moved farther away from the wheels to afford greater clearance therefor. It will be apparent that as the bolt is normally received in the seating recess 12, the brake shoes are positively retained in inoperative position.

From the foregoing description in connection with the accompanying drawing it will be apparent that I have provided an improved brake operating apparatus which may be readily manipulated, which is quite practical and which consists of comparatively few parts and hence is not likely to get out of order.

It will be noticed that the device is susceptible of being easily and cheaply manufactured.

While the invention is designed particularly for use in connection with wagons or other vehicles for operating the brakes thereof, it is to be understood that it is not limited to any such use but is susceptible of general application.

Having thus described the invention, what I claim is:

In combination, an operating lever formed with a slot having a return-curve at one end to constitute a seating recess, the slot being angularly disposed at its other end to provide a second seating recess, a rod, means for connecting the rod to the lever, said connecting means operating in the slot and being adapted to be retained in any selected one of the seating recesses, and a hand grip secured to the rod for shifting the connecting means in the slot, the second seating recess being terminally enlarged to provide opposed undercut side walls, as and for the purpose specified.

In testimony whereof, I affix my signature in presence of two witnesses.

JOHN H. McCLAREN. [L. S.]

Witnesses:
R. B. NAYLOR,
C. F. CRAWFORD.

---

Copies of this patent may be obtained for five cents each, by addressing the "Commissioner of Patents, Washington, D. C."